(12) United States Patent
Maguire

(10) Patent No.: US 9,841,010 B2
(45) Date of Patent: Dec. 12, 2017

(54) METHOD AND APPARATUS FOR CLOSED LOOP AUTOMATIC REFILL OF LIQUID COLOR

(71) Applicant: Stephen B. Maguire, West Chester, PA (US)

(72) Inventor: Stephen B. Maguire, West Chester, PA (US)

(*) Notice: Subject to any disclaimer, the term of this patent is extended or adjusted under 35 U.S.C. 154(b) by 2 days.

(21) Appl. No.: 14/620,345

(22) Filed: Feb. 12, 2015

(65) Prior Publication Data

US 2015/0233369 A1    Aug. 20, 2015

Related U.S. Application Data

(60) Provisional application No. 61/939,816, filed on Feb. 14, 2014.

(51) Int. Cl.
*F16K 21/18* (2006.01)
*G05D 9/04* (2006.01)
(Continued)

(52) U.S. Cl.
CPC ............ *F04B 23/02* (2013.01); *F04B 49/065* (2013.01); *F04B 49/20* (2013.01); *F16K 21/18* (2013.01);
(Continued)

(58) Field of Classification Search
CPC ....... Y10T 137/7339; Y10T 137/86043; Y10T 137/86035; Y10T 137/86187; Y10T 137/0374; Y10T 137/2673; Y10T 137/87877; Y10T 137/2668; Y10T 137/2693; Y10T 137/2695; Y10T 137/2698; Y10T 137/4673; Y10T 137/469; Y10T 137/4757; Y10T 137/4857; Y10T 137/7313; Y10T 137/85928;
(Continued)

(56) References Cited

U.S. PATENT DOCUMENTS

| 600,233 A | 3/1898 | Palm |
|---|---|---|
| 1,451,759 A | 4/1923 | Bruhn |

(Continued)

FOREIGN PATENT DOCUMENTS

| CN | 2809263 Y | 8/2006 |
|---|---|---|
| DE | 3433693 A1 | 3/1986 |

(Continued)

OTHER PUBLICATIONS

International Search Report for PCT/US2014/053391 dated Jan. 29, 2015.
(Continued)

*Primary Examiner* — Marina Tietjen
*Assistant Examiner* — Hailey K Do
(74) *Attorney, Agent, or Firm* — Fox Rothschild LLP

(57) ABSTRACT

Method and apparatus for furnishing process machines with liquid color from a supply thereof provides a loop conduit having respective ends receiving liquid color from the supply and discharging liquid color back into the supply, pumping liquid color through the loop conduit and discharging liquid color from the loop conduit at an intermediate position into a reservoir associated with a process machine upon liquid color level in the reservoir being at a low level limit.

3 Claims, 3 Drawing Sheets

(51) Int. Cl.
*F04B 23/02* (2006.01)
*G05D 9/12* (2006.01)
*F04B 49/06* (2006.01)
*F04B 49/20* (2006.01)

(52) U.S. Cl.
CPC ............... *G05D 9/04* (2013.01); *G05D 9/12* (2013.01); *F04B 2201/1201* (2013.01); *Y10T 137/0324* (2015.04); *Y10T 137/2673* (2015.04); *Y10T 137/2698* (2015.04); *Y10T 137/469* (2015.04); *Y10T 137/4757* (2015.04); *Y10T 137/7287* (2015.04); *Y10T 137/7313* (2015.04); *Y10T 137/7339* (2015.04); *Y10T 137/86027* (2015.04); *Y10T 137/86035* (2015.04)

(58) Field of Classification Search
CPC ..... Y10T 137/86002; Y10T 137/86027; F16K 21/18; E03D 1/32; G05D 9/04; G05D 9/12; A01K 7/04
USPC ............................................. 137/386; 348/89
See application file for complete search history.

(56) References Cited

U.S. PATENT DOCUMENTS

| | | | |
|---|---|---|---|
| 1,482,376 A * | 2/1924 | Anderson | F04D 15/0005 137/565.34 |
| 1,489,348 A | 4/1924 | Hampton | |
| 2,188,646 A | 1/1940 | Bunch | |
| 2,199,657 A | 5/1940 | Bunch | |
| 2,387,233 A | 10/1945 | Clapp | |
| 2,606,696 A | 8/1952 | Miner | |
| 2,656,828 A | 10/1953 | Conover | |
| 2,665,825 A | 1/1954 | Poitras et al. | |
| 2,701,881 A | 2/1955 | McGee | |
| 2,873,892 A | 2/1959 | Nelson et al. | |
| 2,909,315 A | 10/1959 | Sampietro | |
| 2,956,822 A | 10/1960 | Kates | |
| 3,391,645 A | 7/1968 | Koza | |
| 3,477,698 A | 11/1969 | Smith et al. | |
| 3,518,033 A | 6/1970 | Anderson | |
| 3,785,412 A | 1/1974 | Stone | |
| 3,814,388 A | 6/1974 | Jakob | |
| 3,883,275 A | 5/1975 | Browne | |
| 3,957,399 A | 5/1976 | Siczek | |
| 3,988,088 A | 10/1976 | King et al. | |
| 3,998,103 A | 12/1976 | Bjorklund et al. | |
| 4,185,948 A | 1/1980 | Maguire | |
| 4,469,127 A | 9/1984 | Kitamura | |
| 4,473,173 A | 9/1984 | DeGroff et al. | |
| 4,501,405 A | 2/1985 | Usry | |
| 4,571,416 A | 2/1986 | Jarzombek et al. | |
| 4,586,882 A | 5/1986 | Tseng | |
| 4,605,297 A | 8/1986 | Livingston et al. | |
| 4,606,710 A | 8/1986 | Maguire | |
| 4,621,990 A | 11/1986 | Forsythe et al. | |
| 4,657,490 A | 4/1987 | Abbott | |
| 4,759,189 A | 7/1988 | Stropkay | |
| 4,834,071 A | 5/1989 | Hosoi et al. | |
| 4,921,132 A | 5/1990 | Wales | |
| 4,967,940 A | 11/1990 | Blette et al. | |
| 5,039,279 A | 8/1991 | Natwick et al. | |
| 5,116,547 A | 5/1992 | Tsukahara et al. | |
| 5,199,852 A | 4/1993 | Danby | |
| 5,215,215 A | 6/1993 | Sauer | |
| 5,225,210 A | 7/1993 | Shimoda | |
| 5,344,232 A | 9/1994 | Nelson et al. | |
| 5,364,242 A | 11/1994 | Olsen | |
| 5,609,191 A * | 3/1997 | Topping | B67D 7/002 137/565.17 |
| 5,622,392 A | 4/1997 | Gochenouer | |
| 5,853,244 A | 12/1998 | Hoff et al. | |
| 5,953,923 A | 9/1999 | Davies | |
| 5,980,490 A | 11/1999 | Tsoukalis | |
| 5,984,777 A | 11/1999 | Kuchar | |
| 5,988,983 A | 11/1999 | Furusawa | |
| 6,007,236 A | 12/1999 | Maguire | |
| 6,026,837 A * | 2/2000 | Chen | G05D 9/12 137/2 |
| 6,057,514 A | 5/2000 | Maguire | |
| 6,125,876 A * | 10/2000 | Laederich | B24B 37/04 137/255 |
| 6,188,936 B1 | 2/2001 | Maguire et al. | |
| 6,213,739 B1 | 4/2001 | Phallen et al. | |
| 6,386,841 B1 | 5/2002 | Probst | |
| 6,402,363 B1 | 6/2002 | Maguire | |
| 6,502,013 B1 | 12/2002 | Sosnik | |
| 6,523,451 B1 | 2/2003 | Liao | |
| 6,599,005 B2 | 7/2003 | van Der Wei | |
| 6,669,358 B2 | 12/2003 | Shimoda | |
| 6,719,453 B2 | 4/2004 | Cosman et al. | |
| 6,880,965 B1 | 4/2005 | Sheffield, Jr. | |
| 6,991,004 B2 | 1/2006 | Kaufhold et al. | |
| 7,118,349 B2 | 10/2006 | Oglesby | |
| 7,154,069 B1 | 12/2006 | Gordon | |
| 7,201,290 B2 | 4/2007 | Mehus | |
| 7,311,882 B1 | 12/2007 | Renzi | |
| 7,390,119 B2 | 6/2008 | Maguire | |
| 7,416,096 B2 | 8/2008 | Maguire | |
| 7,594,717 B2 * | 9/2009 | Sheinman | B41J 2/175 347/89 |
| 7,958,915 B2 | 6/2011 | Maguire | |
| 7,980,834 B2 | 7/2011 | Maguire | |
| 8,042,578 B2 | 10/2011 | Post | |
| 8,627,852 B2 | 1/2014 | Hatton | |
| 8,757,217 B2 | 6/2014 | Maguire | |
| 8,800,821 B2 | 8/2014 | Maguire et al. | |
| 9,188,118 B2 | 11/2015 | Maguire | |
| 2002/0023449 A1 | 2/2002 | Park et al. | |
| 2002/0031822 A1 | 3/2002 | Van Der Wei et al. | |
| 2002/0122103 A1 | 9/2002 | Yamamoto et al. | |
| 2002/0189667 A1 | 12/2002 | O'Dougherty et al. | |
| 2003/0071868 A1 | 4/2003 | Koshikawa et al. | |
| 2003/0142580 A1 | 7/2003 | Maguire | |
| 2003/0218014 A1 | 11/2003 | Gregory et al. | |
| 2005/0052945 A1 | 3/2005 | Maguire | |
| 2005/0126638 A1 | 6/2005 | Gilbert | |
| 2006/0067844 A1 | 3/2006 | Iversen | |
| 2007/0071624 A1 | 3/2007 | Brewer | |
| 2010/0322644 A1 | 12/2010 | Ajima | |
| 2011/0200464 A1 | 8/2011 | Maguire et al. | |
| 2012/0195771 A1 | 8/2012 | Brender a Brandis | |
| 2012/0260992 A1 | 10/2012 | Maguire | |
| 2013/0334258 A1 | 12/2013 | Maguire | |
| 2014/0087035 A1 * | 3/2014 | Cummings | A23L 3/02 426/232 |
| 2014/0147288 A1 | 5/2014 | Maguire | |
| 2014/0224830 A1 | 8/2014 | Maguire | |
| 2015/0020713 A1 | 1/2015 | Maguire | |
| 2015/0066794 A1 | 3/2015 | Maguire et al. | |
| 2015/0108748 A1 | 4/2015 | Maguire | |
| 2015/0165662 A1 | 6/2015 | Maguire | |
| 2016/0040661 A1 | 2/2016 | Maguire | |

FOREIGN PATENT DOCUMENTS

| | | |
|---|---|---|
| FR | 1 477 595 A | 4/1967 |
| GB | 1145752 | 3/1969 |
| JP | 3550699 B2 | 8/2004 |
| WO | WO 01/49374 A1 | 7/2001 |
| WO | WO 2015/089499 | 6/2015 |

OTHER PUBLICATIONS

Written Opinion for PCT/US2014/053391 dated Jan. 29, 2015.
Wayback Machine of SMC Linear Actuators Sep. 11, 2011, SMC, Accessed on Apr. 6, 2016.
Wayback Machine of SMC Linear Actuator C02 Series Catalog, Sep. 11, 2011, SMC, Accessed on Apr. 6, 2016.

(56) References Cited

OTHER PUBLICATIONS

Forty-four page two-sided brochure including cover and back pages entitled "Maguire: Auxiliary equipment for the plastics industry" of Maguire Products, Inc., Oct. 2000.
Two-sided color brochure entitled Maguire: Model MPA Liquid Color Pump , Maguire Products, Inc., published Dec. 28, 1995.
International Search Report for PCT/US02/02934, dated Feb. 20, 2003.
Written Opinion for PCT/US02/02934, dated Mar. 24, 2003.
International Search Report for PCT/US11/021994, dated May 24, 2011.
Written Opinion for PCT/US11/021994, dated May 24, 2011.
Thirty-two page catalog entitled "Maguire Color Blending Equipment" published by Maguire Products, Inc., 1993, United States.
International Search Report for PCT/US2014/070264 dated Apr. 15, 2015.
Written Opinion for PCT/US2014/070264 dated Apr. 15, 2015.

\* cited by examiner

METHOD AND APPARATUS FOR CLOSED LOOP AUTOMATIC REFILL OF LIQUID COLOR

CROSS-REFERENCE TO RELATED PATENT APPLICATION

This patent application claims the benefit of the priority of U.S. provisional application Ser. No. 61/939,816 filed 14 Feb. 2014 in the name of Stephen B. Maguire and entitled "Liquid Color Closed Loop Automatic Refill System"; the priority is claimed under 35 USC 119 and 35 USC 120.

BACKGROUND OF THE INVENTION

Liquid color is metered from containers. When the liquid runs out and a process machine, namely an injection molding machine or extruder, is operating producing plastic parts, there is a time period where no color is being metered, and production parts must be scrapped because they do not get the required color. One solution is to alarm when color level is low, and change the liquid color container before the liquid color runs out. However, this results in the remaining liquid color being wasted, or a mess due to spillage, when transferring the remaining liquid color into the new container.

A better solution is to simply refill the container before the liquid color runs out. Currently available systems for doing this involve a level sensor to detect low level in the primary container, and then a reserve container and pump standing by for refilling the primary container.

The reserve container may be small, but preferably is large enough to last for many weeks. Two thousand pound capacity totes are standard in the industry.

This reserve container may be very close, or may be located at some distance. In either case a pump is required for the reserve container for transferring the liquid color into the primary container.

Factories always have many process machines. Each requires its own primary supply of color, and its own metering pump. In current systems if, for example, 5 process machines are running and automatic refill of these containers is desired, then each process machine requires its own "reserve" container and a reserve pump as well. This need for 5 reserve containers and 5 pumps is still present even if all process machines are running the same color.

SUMMARY OF THE INVENTION

When multiple process machines are running the same color, a more efficient system as provided by the instant invention is to have one large reserve container with a pump to resupply all primary containers.

That is how the system of this invention works. One large reserve container is preferably used to refill each of the primary containers when any one of the primary containers runs low on liquid color.

As a further refinement, this invention preferably also incorporates a closed loop system to supply liquid color to all of the process machines. Liquid is preferably continuously pumped out through a piping system that reaches all of the process machines and then returns to the reserve container. This assures a constant supply of "fresh" liquid color, with no risk of the liquid color settling or separating in the liquid color supply lines. (Settling can occur when liquid color heavily loaded with pigment is left sitting in the liquid color supply conduit.) As an added benefit, this continuous flow also assures continuous turnover of liquid color and mixing of the liquid color in the reserve container.

When a primary container requires liquid color, the invention preferably uses a diverter valve to divert the liquid color flow from the circulation loop into the selected primary container. As an additional feature, to allow refill to occur as rapidly as possible, the invention preferably increases the pump rate of the circulation pump to its maximum. When not refilling a container the recirculation pump rate is slowed to a rate that is reasonable and that conserves energy, or in the most preferred practice of the invention, conserves compressed air that is preferably used to drive the pump.

As an added feature of the invention, metering systems, with one located at each process machine, use load cells to control metering gravimetrically. The load cells are also available to signal the proper time for refill to occur. Level sensors can be used in place of the load cells.

In one of its aspects, this invention provides a method for furnishing process machines with liquid color from a supply thereof where the method preferably commences with providing a loop conduit having respective ends receiving liquid color from the supply and discharging liquid color into the supply. The method preferably proceeds with pumping liquid color through the loop conduit. The method then discharges liquid color from the loop conduit at an intermediate position thereon into a reservoir associated with a process machine upon the process machine signaling a need for liquid color.

The method may further include providing at least one valve in the conduit for discharging liquid color therefrom and discharging liquid color from the loop conduit by actuating the valve.

In another one of its aspects, this invention preferably provides apparatus for furnishing process machines with liquid color where the apparatus preferably includes a supply of liquid color, a loop conduit for carrying liquid color with the loop conduit preferably running from the supply to the process machines and back to the supply, a pump for circulating liquid color around the loop, a detector for sensing when liquid color is needed by an associated process machine, and a valve in the loop for diverting liquid color from the loop to the associated process machine upon the detector sensing the need for replenishment. In an apparatus aspect of the invention, a solenoid is preferably provided for actuating the valve. Furthermore in an apparatus aspect of the invention, segments of the loop conduit are preferably structurally mounted adjacent to one another such that liquid color travels in opposite directions in the mounted segments and the valve is in one of the segments.

In still another one of its aspects, this invention provides a method for furnishing process machines such as injection molding presses, compression molding presses and extruders, and ancillary machines such as receivers and gravimetric blenders, with liquid color from a supply of liquid color. In one of these method aspects, the invention proceeds by providing a loop conduit having respective ends receiving liquid color from the supply and discharging liquid color back into the supply, and discharging liquid color from the conduit loop at an intermediate position thereon into a reservoir associated with a process machine upon the process machine signaling a need for liquid color.

The method may further include intermittently mixing liquid color in the supply or continuously mixing liquid color in the supply.

In yet another one of its aspects, the method may further include increasing pumping speed whenever liquid color is being discharged from the loop conduit into a reservoir associated with a process machine. The method may further include providing at least one diverter valve in the conduit for discharging liquid color from the conduit, and specifically discharging the liquid color from the liquid conduit by actuating the diverter valve.

In still another aspect of the invention, the invention embraces the steps of sensing weight of the reservoir and upon sensed weight of the reservoir falling below a pre-selected value, actuating a diverter valve to discharge liquid color from the conduit to replenish the reservoir.

The method may further embrace sensing the weight of the reservoir and upon sensed reservoir weight falling below a pre-selected value, discharging liquid color from the conduit to replenish the reservoir.

The method may further embrace the step of increasing pumping speed upon sensed reservoir weight decreasing to within a pre-selected amount of the pre-selected level and decreasing pumping speed upon sensed reservoir weight increasing to at least the pre-determined level.

In another one of its aspects, this invention provides a method for furnishing process machines with liquid color from a supply by providing a loop conduit having respective ends receiving liquid color from the supply and discharging liquid color into the supply, pumping liquid color through the loop conduit, mixing liquid color in the supply, providing at least one valve in the conduit for discharging liquid color therefrom, discharging liquid color from the loop conduit into a reservoir associated with the process machine by opening a valve in the loop conduit upon the process machine signaling a need for liquid color, halting discharge of liquid color from the loop conduit, and increasing pumping speed upon sensed reservoir weight decreasing to within a pre-selected amount of the pre-selected level but decreasing pumping speed upon sensed reservoir weight increasing to at least the pre-determined level.

In still yet another one of its aspects, this invention provides apparatus for furnishing process machines with liquid color where the apparatus includes a loop conduit for carrying liquid color running from the supply to the process machines and back to the supply, a pump for circulating liquid color around the loop, a detector for sensing when additional liquid color is needed by an associated process machine, and a valve in the loop for diverting liquid color from the loop to the associated process machine upon the detector sensing the need for replenishment. The apparatus may further include a reservoir associated with each process machine for temporarily storing liquid color received from the loop conduit until needed by the process machine and a load cell for detecting the weight of the reservoir and hence the amount of liquid color therein.

The apparatus may further preferably include a solenoid for actuating the valve.

In one more aspect of the apparatus, segments of the loop conduit may be structurally mounted adjacent to one another such that liquid color travels at opposite directions in the mounted segments and the valve is in one of those segments.

DETAILED DESCRIPTION OF THE INVENTION

Figure 1:
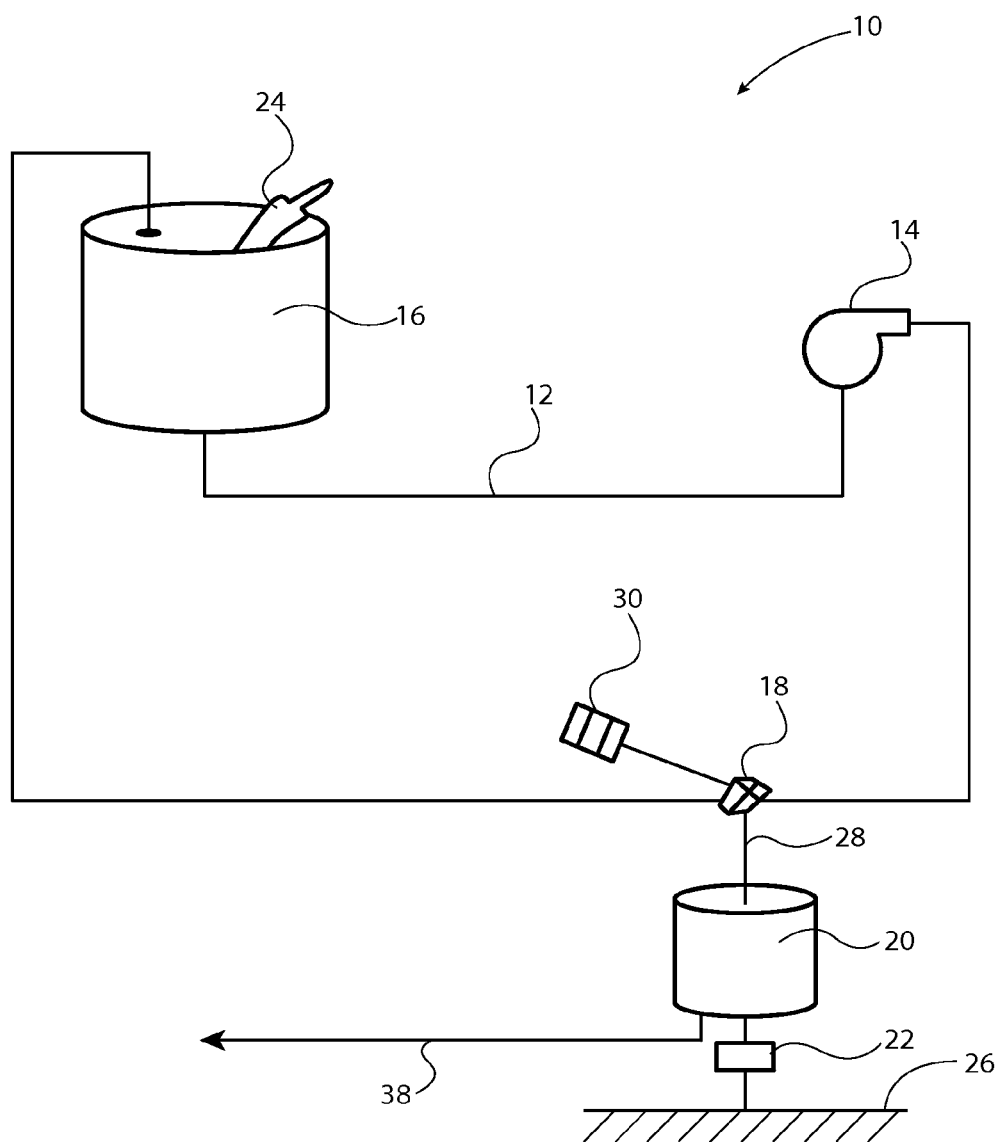
FIG. 1 is a schematic representation of apparatus embodying the method for practicing aspects of the invention.

Referring to the drawings in general and to FIG. 1 in particular, apparatus embodying the invention and suitable for practice the method aspects of the invention is designated generally 10 and includes a loop conduit 12 leading from a liquid color supply 16 to a pump 14. From the pump 14, the loop conduit 12 proceeds to a diverter valve 18 and from diverter valve 18 on around to the liquid color supply 16 to deposit liquid color that has not been diverted by valve 18 back into liquid color supply 16. Diverter valve 18, when actuated, diverts liquid color from loop conduit 12 down through supply conduit 28 into a reservoir or holding tank 20.

A load cell 22 senses the weight of reservoir or holding tank 20 and thereby senses the weight of liquid color within reservoir or holding tank 20. Load cell 22 may be supported by structure resting on a floor 26. It is to be understood that any suitable structure may be used for supporting load cell 22 in a position to sense the weight of reservoir or holding tank 20.

An agitator or mixer 24 is provided for mixing liquid color within a supply 16. Agitator or mixer 24 is depicted only schematically. Agitator or mixer 24 is conventionally motor-driven.

Diverter valve 18 is preferably actuated by solenoid 30. Upon actuation of valve 18 by solenoid 30, liquid color flowing through loop conduit 12 is diverted to flow down through supply conduit 28 into reservoir or holding tank 20, rather than flowing around the remainder of loop conduit 12 and back into liquid color supply 16.

Solenoid 30 actuates diverter valve 18 to open diverter valve 18 to permit flow of liquid color through supply conduit 28 into reservoir 20 upon sensed weight of reservoir 20 being low, indicating a low level of liquid color within reservoir 20. Weight sensing is performed by load cell 22. Once load cell 22, which continuously senses weight of reservoir or holding tank 20, senses that reservoir or holding tank 20 is beginning to approach its maximum capacity for liquid color, a signal is sent to solenoid 30. The signal de-actuates diverter valve 18 whereupon no liquid color is permitted to flow into supply conduit 28, but rather liquid color continues to flow through valve 18 around loop conduit 12 and back to liquid color supply 16.

The invention further embraces regulation of the speed of pump 14. Desirably the speed of pump 14 is increased upon the sensed weight of reservoir 20 decreasing to within a pre-selected amount of a pre-selected low level, but speed of pump 14 is decreased upon the sensed weight of reservoir 20 increasing to at least a pre-determined high level.

The invention further embraces regulation of the mixing or agitation provided by agitator/mixer 24 for liquid color in liquid color supply 16. A feed line 38 leads from reservoir or holding tank 20 to the associated process machine to supply liquid color to the process machine, as indicated by the arrow in FIG. 1.

Figure 2:
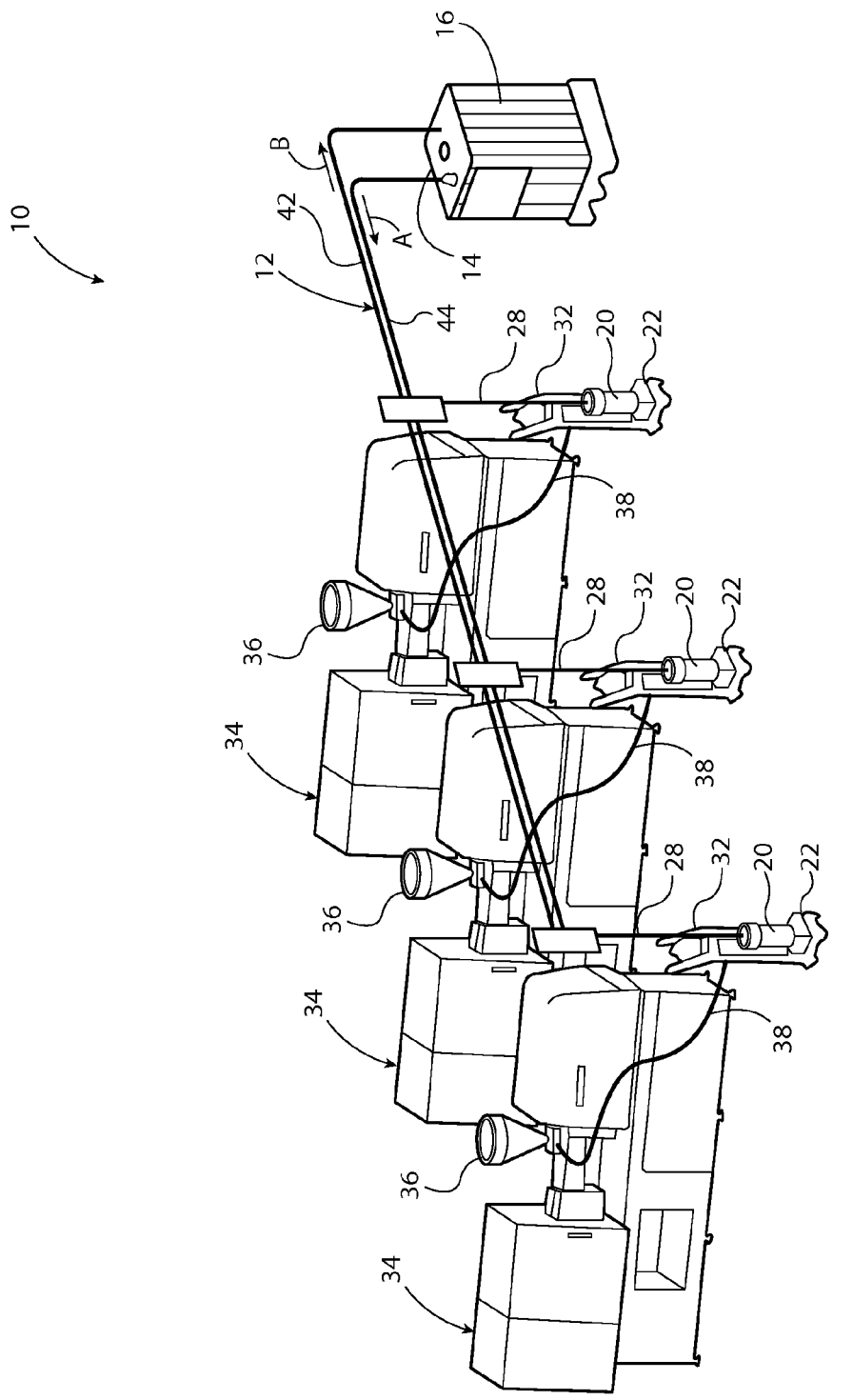
FIG. 2 is an artist's rendition, in isometric form, of apparatus manifesting aspects of the invention and showing a number of process machines receiving liquid color in accordance with the invention.

Referring now to FIG. 2 which is an artist's rendition of the manner in which the invention and apparatus embodying the invention might be installed in a plastic injection molding facility, apparatus in accordance with the invention is designated generally 10 with the loop conduit designated generally 12 and a pump designated generally 14 being associated with a reservoir or holding tank 20, all as illustrated in FIG. 2. Valves 18 are provided for diverting liquid color from loop conduit 12 into individual reserve or holding tanks 20 with one such reserve or holding tank 20 being associated with each one of the process machines 34, which in the drawing are illustrated as injection molding presses. Valves 18 are not visible in FIG. 2.

Liquid color is delivered from individual reservoirs or holding tanks 20 to the process machines 34 by supply conduits 38. There is one supply conduit 38 for each reservoir/holding tank 20-process machine 34 combination as illustrated in FIG. 2. Weight of each reservoir or holding tank 20 is measured by an associated load cell 22 located preferably below reservoir or holding tank 20. There is preferably an individual load cell 22 for each reservoir or holding tank 20. Load cells 22 are supported by suitable structure, which also supports the associated reservoir or holding tank 20 and which preferably rests on a floor 26 of the facility in which process machines 34 are located.

An agitator or mixer is provided for liquid color residing in liquid color supply 16. Hoppers 36 associated with each one of process machines 34, in this case injection molding presses, retain granular resin until the granular resin is needed by the molding machine for the manufacture of plastic parts.

Each reservoir/holding tank 20 is connected to loop conduit 12 by a supply conduit 28 leading downwardly from a diverter valve, not shown in FIG. 2, that when actuated by a solenoid, not shown in FIG. 2, diverts liquid color from loop conduit 12 downwardly through supply conduit 28 into reservoir or holding tank 20.

A feed line 38 is provided for each of the reservoir/holding tank-process machine combinations as illustrated in FIG. 2.

A controller 32 is provided for each reservoir or holding tank 20. Controller 32 actuates solenoid 30 thereby to open diverter valve 18 and permit downward flow of liquid color, under pressure, from loop conduit 12 into reservoir or holding tank 20.

Figure 3:
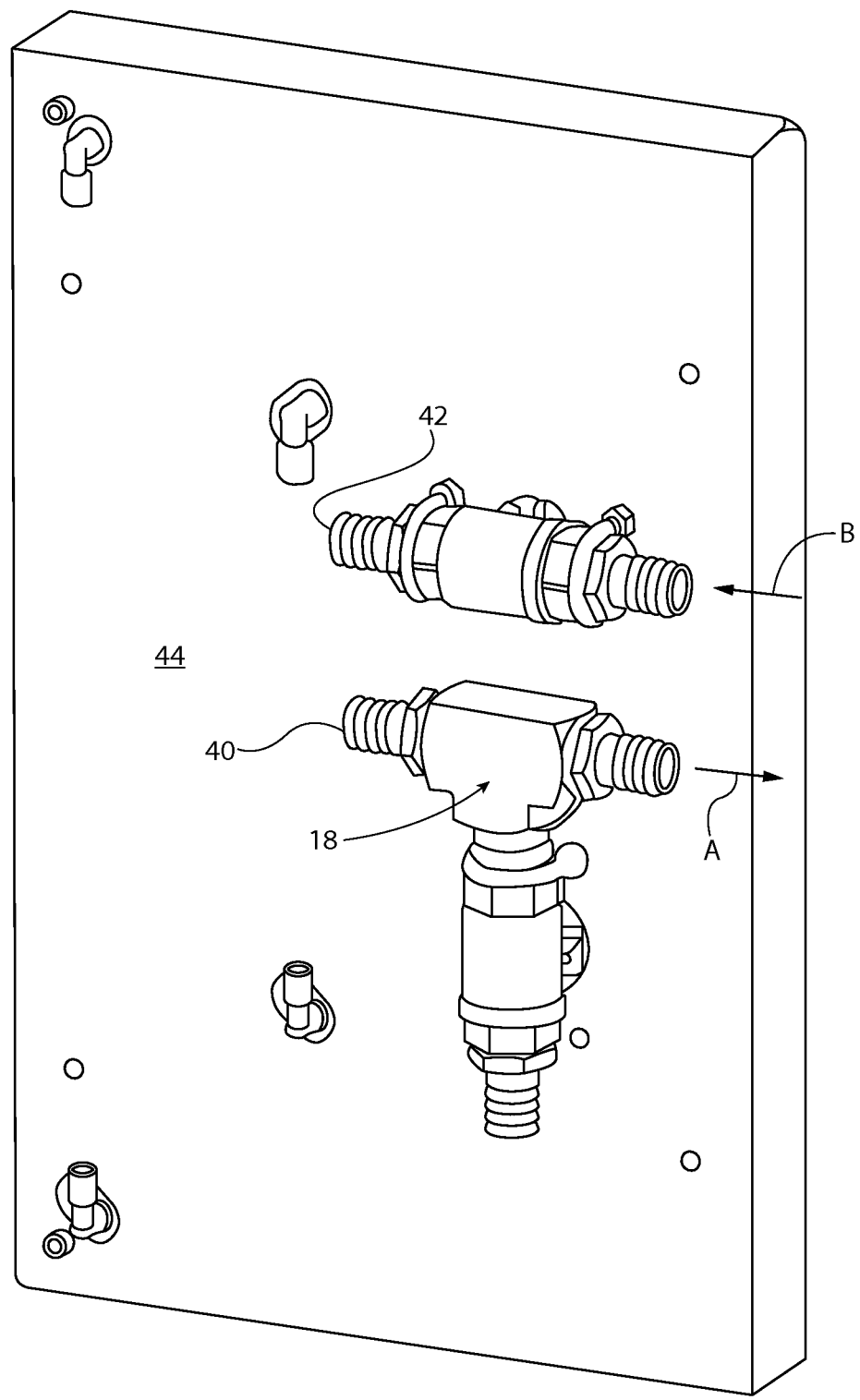
FIG. 3 is an isometric drawing of a portion of a loop conduit of the invention, with a diverter valve positioned therein, with the conduit and the diverter valve mounted on a common support structure.

FIG. 3 illustrates a mounting block/diverter valve/loop conduit segment assembly, one of which is provided for each reserve holding tank 20. Mounting block 44 is mounted on a framework 46 that is associated with and supports reservoir/holding tank 20, load cell 22 and solenoid 30. Framework 46 is illustrated and designated so in FIG. 2, but is not illustrated in FIG. 3.

Mounting block 44 supports outbound segment 40 and inbound segment 42 of loop conduit 12. A diverter valve 18 is provided in the outbound segment of loop conduit 40 and is actuated by solenoid 30. Upon energizing solenoid 30 and consequent activation of diverter valve 18, liquid color flowing in the outbound segment 40 of loop conduit 12 is diverted downwardly by valve 18 and flows through supply conduit 28 into a particular reservoir or holding tank with which diverter valve 18 and supply conduit 28 are associated. Arrows A and B in FIG. 3 denote the direction of flow of liquid color with liquid color flowing outwardly as indicated by arrow A through outbound segment 40 of loop conduit 12 and liquid color returning to supply 16 through inbound segment 42 of loop conduit 12 as indicated by arrow B.

During operation, liquid color is desirably pumped continuously by pump 14 out of liquid color supply 16 through loop conduit 12. With loop conduit 12 being a "continuous" conduit, loop conduit 12 reaches all of process machines 34, albeit indirectly, through supply conduits 28 and feed lines 38, with loop conduit 12 then returning to liquid color supply 16. This assures a constant supply of "fresh" liquid color with no risk of the liquid color settling or separating in the liquid color supply line, namely loop conduit 12. As an additional benefit, this continuous flow through loop conduit 12 assures continuous turnover of liquid color and mixing of the liquid color in liquid color supply 16.

When a reserve or holding tank 20 requires liquid color, diverter valve 18 is actuated to divert liquid color from loop conduit 12, specifically from the outbound segment 40 of loop conduit 12, into the associated reservoir or holding tank 20. Preferably, when a reservoir or holding tank 20 requires additional liquid color, the speed of pump 14 is increased to drive liquid color through loop conduit 12 faster and at higher pressure, thereby to minimize the time required for liquid color replenishment into reservoir or holding tank 20. When not refilling a reservoir or holding tank 20, pump 14 is preferably slowed to a rate that is reasonable and conserves energy, while continuing to circulate liquid color around loop conduit 12.

The metering system, namely the solenoid 30 and controller 32 associated with each reservoir or holding tank 20 uses a load cell 22 to control the metering of liquid color into each reservoir or holding tank 20 gravimetrically. Load cell 20 additionally signals the proper time for refill to occur, namely when the amount of liquid color in reservoir or holding tank 20 is excessively low and there is risk that there will be insufficient liquid color flowing through feed line 38 to satisfy the needs of process machine 34. While use of load cells is preferable, level sensors in reserve or holding tank 20 may also be used in place of load cells.

In another aspect of the invention, a detector may be provided associated with a process machine 34 to indicate when liquid color is needed by that associated process machine. The detector then provides signal to the controller 32 which actuates solenoid 30 to move diverter valve 18 so that liquid color is supplied through supply conduit 28 to reservoir/holding tank 20. Desirably, a signal is also provided at that time to pump 14 to drive pump 14 at its maximum speed, to provide liquid color at high pressure thereby quickly filling the associated reserve or holding tank 20 and replenishing the liquid color needed by the associated process machine 34.

As illustrated in FIG. 3, liquid color preferably moves in opposite directions with respect to mounting block 44, thereby balancing any stresses on mounting block 44 resulting from the dynamic flow of liquid color in directions A and B in FIG. 3. Additionally, pumping speed of pump 14 is desirably increased upon sensed weight of a reservoir or holding tank 20 decreasing to within a pre-selected amount of a pre-selected level, while decreasing pumping speed upon the sensed reservoir weight increasing to at least the pre-determined level as a result of the reservoir or holding tank 20 being filled with liquid color to a pre-determined level.

I claim the following:

1. Apparatus for furnishing a plurality of process machines with liquid color from a supply thereof, comprising:
   a. a loop conduit having parallel outbound and inbound segments for carrying liquid color, the loop conduit running from the supply to the process machine and back to the supply;
   b. a pump for continuously circulating liquid color around the loop conduit;

c. containers connected to the process machines for receiving liquid color from the loop conduit and holding the liquid color until needed by the respective process machine;
d. a detector for gravimetrically sensing when replenishment of liquid color is needed by a container for a connected process machine;
e. valves in the loop conduit outbound segment for diverting liquid color from the loop conduit to the container connected to the process machine upon the detector sensing the need for replenishment;
f. a plurality of mounting blocks, each mounting block having the inbound and outbound segments of the loop conduit connected thereto, with the outbound segment parallel with and below the inbound segment, each mounting block having one of the valves mounted on the mounting block and connected to the outbound segment, for diverting liquid color from the outbound segment to a reservoir connected to a respective process machine;
g. the pump being connected to the detector and increasing pump speed to a maximum when additional liquid color is needed by any of the connected process machines according to their associated detector.

2. Apparatus of claim 1 further comprising solenoids connected to the plurality of mounting blocks, for actuating the valves mounted on the plurality of mounting blocks.

3. Apparatus of claim 2 wherein the valves are diverter valves.

* * * * *